(12) United States Patent
Kim et al.

(10) Patent No.: US 9,275,433 B2
(45) Date of Patent: Mar. 1, 2016

(54) APPARATUS AND METHOD FOR SCALING LAYOUT OF APPLICATION IN IMAGE DISPLAY DEVICE

(71) Applicant: Samsung Electronics Co. Ltd., Suwon-si, Gyeonggi-do (KR)

(72) Inventors: So-Hyun Kim, Suwon-si (KR); Seung-Gyun Kim, Suwon-si (KR); Haitzler Carsten, Seoul (KR); Sun-Gi Hong, Seoul (KR); Du-Il Kim, Suwon-si (KR); Se-Hwan Park, Suwon-si (KR); Jang-Hyun Yoon, Seongnam-si (KR); Sang-Jin Lee, Seoul (KR); Seok-Jae Jeong, Suwon-si (KR); Jin-Hee Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 48 days.

(21) Appl. No.: 13/737,258

(22) Filed: Jan. 9, 2013

(65) Prior Publication Data
US 2013/0176345 A1    Jul. 11, 2013

(30) Foreign Application Priority Data
Jan. 9, 2012   (KR) .......................... 10-2012-0002446

(51) Int. Cl.
| | |
|---|---|
| *G09G 5/00* | (2006.01) |
| *G06T 3/40* | (2006.01) |
| *G06F 3/048* | (2013.01) |
| *G06T 11/60* | (2006.01) |
| *G06F 3/0481* | (2013.01) |

(52) U.S. Cl.
CPC . *G06T 3/40* (2013.01); *G06F 3/048* (2013.01); *G06T 11/60* (2013.01); *G06F 3/0481* (2013.01); *G06F 2203/04806* (2013.01); *G09G 2340/0407* (2013.01); *G09G 2340/0414* (2013.01)

(58) Field of Classification Search
CPC .............. G09G 2340/0407; G09G 2340/0414; G06T 3/40; G06F 3/0481; G06F 2203/04806
USPC .............. 345/173, 100, 87, 98, 94, 158, 660, 345/204, 671, 667, 619
See application file for complete search history.

(56) References Cited

U.S. PATENT DOCUMENTS

| | | | | |
|---|---|---|---|---|
| 7,345,684 | B2 * | 3/2008 | Gardos ......................... | 345/204 |
| 7,656,432 | B2 * | 2/2010 | Ogawa et al. .............. | 348/222.1 |

(Continued)

FOREIGN PATENT DOCUMENTS

| | | |
|---|---|---|
| KR | 1020060093452 A | 8/2006 |
| KR | 1020070000121 A | 1/2007 |
| KR | 1020070066574 A | 6/2007 |

OTHER PUBLICATIONS

H. Knoche et al., The Big Picture on Small Screens Delivering Acceptable Video Quality in Mobile TV, ACM Transactions on Multimedia Computing, Communications and Applications, Aug. 2009, pp. 1-27, XP055155510, vol. 5, No. 3, Article 20, University College London, UK.

*Primary Examiner* — Abderrahim Merouan
(74) *Attorney, Agent, or Firm* — Jefferson IP Law, LLP

(57) ABSTRACT

An apparatus and method for scaling a layout of an application in an image display device are provided. The method for scaling includes generating a scaling variable considering a distance between the image display device and a user, and scaling a layout of an application using the scaling variable.

20 Claims, 10 Drawing Sheets

(56) References Cited

U.S. PATENT DOCUMENTS

| | | | |
|---|---|---|---|
| 7,796,116 B2* | 9/2010 | Salsman et al. | 345/158 |
| 7,889,178 B2* | 2/2011 | Chan et al. | 345/166 |
| 7,924,297 B2* | 4/2011 | Morikawa et al. | 345/660 |
| 2003/0234799 A1* | 12/2003 | Lee | 345/660 |
| 2004/0160386 A1* | 8/2004 | Michelitsch et al. | 345/10 |
| 2005/0190203 A1 | 9/2005 | Gery et al. | |
| 2007/0103747 A1* | 5/2007 | Powell et al. | 359/13 |
| 2008/0062131 A1* | 3/2008 | Chan et al. | 345/166 |
| 2008/0074444 A1* | 3/2008 | Morikawa et al. | 345/660 |
| 2008/0143877 A1* | 6/2008 | Urabe et al. | 348/556 |
| 2009/0059364 A1* | 3/2009 | Brown et al. | 359/421 |
| 2009/0161191 A1* | 6/2009 | Powell | 359/207.7 |
| 2009/0174658 A1* | 7/2009 | Blatchley et al. | 345/158 |
| 2010/0073128 A1* | 3/2010 | Talwerdi | 340/5.8 |
| 2010/0174421 A1* | 7/2010 | Tsai | G06F 1/1616 700/302 |
| 2010/0194784 A1* | 8/2010 | Hoff | G06F 3/0488 345/661 |
| 2011/0148931 A1 | 6/2011 | Kim | |
| 2012/0246678 A1* | 9/2012 | Barksdale | 725/37 |
| 2012/0287163 A1* | 11/2012 | Djavaherian | 345/667 |
| 2013/0027614 A1* | 1/2013 | Bayer et al. | 348/563 |
| 2013/0069947 A1* | 3/2013 | Berstler | G06T 3/40 345/428 |
| 2013/0147845 A1* | 6/2013 | Xie et al. | 345/660 |
| 2014/0160148 A1* | 6/2014 | Barkett et al. | 345/619 |
| 2014/0252097 A1* | 9/2014 | Slavin et al. | 235/494 |

* cited by examiner

SIZE IS RELATIVE TO UP/DOWN
ITEMS INSTEAD OF BEING
DESIGNATED IN PIXEL UNIT

APPARATUS AND METHOD FOR SCALING LAYOUT OF APPLICATION IN IMAGE DISPLAY DEVICE

PRIORITY

This application claims the under 35 U.S.C. §119(a) of a Korean patent application filed on Jan. 9, 2012 in the Korean Intellectual Property Office and assigned Serial No. 10-2012-0002446, the entire disclosure of which is hereby incorporated by reference.

BACKGROUND OF THE INVENTION

1. Field of the Invention

The present invention relates to an image display device. More particularly, the present invention relates to an apparatus and method for scaling a layout of an application in the image display device.

2. Description of the Related Art

In recent years, as various types of content is increasingly used, diverse types of image display devices have been used.

As the image display devices become diverse, display region sizes of different image display devices and a resolution thereof may be different. To provide a service suitable to the display region size of each image display device and the resolution thereof, the image display device scales a layout of an application to be displayed in a display region considering the display region size of each image display device and the resolution thereof.

To scale a layout of an application based on a resolution of an image display device, the image display device scales the layout of the application based on a ratio of resolution of the image display device to reference resolution. For example, when a second image display device having a resolution of 800×1280 executes an application executed in a first image display device having a resolution of 480×800, the second image display device scales a layout of the application to 1.67 times (800/480) based on a ratio of horizontal resolution (i.e., 800) of the second image display device to horizontal resolution (i.e., 480) of the first image display device.

As described above, when scaling a layout of an application based on a resolution of an image display device, the image display device may express objects in the layout of the application as too large or too small due to a difference of a pixel density. Similarly, an amount of information presentable in a unit display region may be different due to the difference of the pixel density.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages below. Accordingly, an aspect of the present invention is to provide an apparatus and method for scaling a layout of an application in an image display device.

Another aspect of the present invention is to provide an apparatus and method for scaling a layout of an application considering a distance with a user in an image display device.

Another aspect of the present invention is to provide an apparatus and method for scaling a layout of an application considering a size of a display region, a resolution, and a distance with a user in an image display device.

Another aspect of the present invention is to provide an apparatus and method for changing a position of an object in a scaled layout of an application in an image display device.

Another aspect of the present invention is to provide an apparatus and method for scaling at least one object, which is part of a layout of an application, considering a distance with a user in an image display device.

Another aspect of the present invention is to provide an apparatus and method for scaling a layout of an application using a plurality of scaling schemes in an image display device.

The above aspects are achieved by providing an apparatus and method for scaling a layout of an application in an image display device.

In accordance with an aspect of the present invention, a method for scaling a layout of an application in an image display device is provided. The method includes generating a scaling variable based on a distance between the image display device and a user, and scaling a layout of an application based on the scaling variable.

In an exemplary implementation, the generating of the scaling variable includes determining Pixels Per Degree (PPD) of the image display device based on the distance between the image display device and the user, a resolution of the image display device, and a size of a display region of the image display device, and generating the scaling variable based on the PPD of the image display device and reference PPD.

In an exemplary implementation, the determining of the PPD includes determining Dots Per Inch (DPI) of the image display device based on the resolution of the image display device and the size of the display region thereof, determining the distance between the image display device and the user, and determining the PPD of the image display device based on the DPI of the image display device and the distance between the image display device and the user.

In accordance with another aspect of the present invention, an image display device is provided. The image display device includes a controller for generating a scaling variable based on a distance between the image display device and a user, and for scaling a layout of an application based on the scaling variable, and a display unit for displaying the scaled layout of the application.

In an exemplary implementation, the controller includes a distance determiner for determining the distance between the image display device and the user, a PPD determiner for determining PPD of the image display device based on the distance between the image display device and the user, a resolution of the image display device, and a size of a display region of the image display device, and a scaling variable generator for generating the scaling variable based on the PPD of the image display device and reference PPD.

In an exemplary implementation, the PPD determiner determines Dots Per Inch (DPI) of the image display device based on the resolution of the image display device and the size of the display region thereof, and determines the PPD of the image display device based on the DPI of the image display device and the distance between the image display device and the user.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms described below, which are defined considering functions in the present invention, may be different depending on user and operator's intention or practice. Accordingly, the terms should be defined based on the disclosure throughout this specification.

A technology is described below for scaling a layout of an application considering a distance with a user in an image display device according to exemplary embodiments of the present invention. The layout of the application represents a screen configuration for providing service through the application in the image display device.

The image display device may be a mobile communication terminal capable of running an application, a Portable Digital Assistant (PDA), a laptop computer, a desktop computer, a smart phone, a netbook, a Mobile Internet Device (MID), an Ultra Mobile Personal Computer (UMPC), a tablet PC, a navigator, an MPEG Audio Layer-3 (MP3), a smart TeleVision (TV), and the like.

The image display device scales a layout of an application considering a distance with a user, a resolution, and a size of a display region. The image display device may change the number of picture elements (pixels) included in a predetermined range from a user's sight according to the distance between the user and the image display device, generating a scaling variable. The distance between the user and the image display device represents a distance at which the user uses the image display device.

Figure 1:
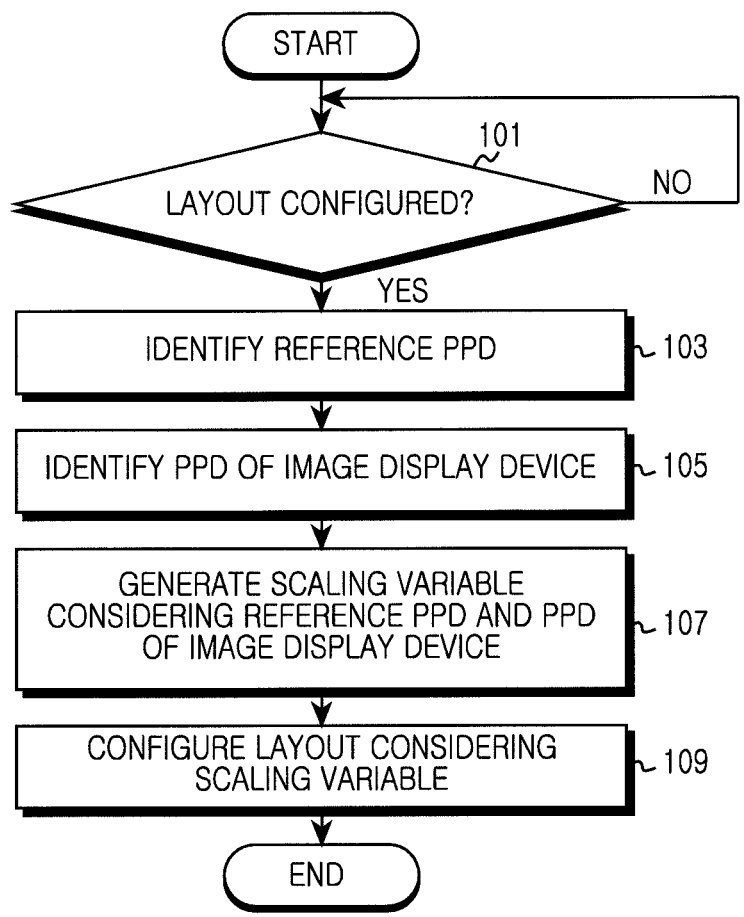
FIG. 1 is a flowchart illustrating a procedure for scaling a layout of an application in an image display device according to an exemplary embodiment of the present invention.

FIG. 1 illustrates a procedure for scaling a layout of an application in an image display device according to an exemplary embodiment of the present invention.

Referring to FIG. 1, in step 101, the image display device determine whether to configure a layout of an application. For example, the image display device may determine whether a user needs to select an application and configure a layout of the corresponding application.

If it is determined to configure the layout of the application, the image display device determines a reference Pixels Per Degree (PPD) in step 103. The reference PPD may represent PPD becoming a reference in running the application. For example, when a second image display device 200 illustrated in FIG. 2 configures a layout of an application, the second image display device 220 may use PPD of a first image display device 210 as the reference PPD. The PPD represents the number of pixels of the image display device included in a range of an angle of 1° from a user's sight according to a distance between the user and the image display device.

After determining the reference PPD, the image display device determines a PPD of the image display device in step 105. For example, the image display device may determine the PPD of the image display device dependent on the distance with the user. The image display device may estimate the distance with the user considering a size of a display region.

After determining the reference PPD and the PPD of the image display device, the image display device generates a scaling variable in step 107 considering the reference PPD and the PPD of the image display device. For example, the image display device may set a ratio of PPD of the image display device to reference PPD, as the scaling variable.

After generating the scaling variable, the image display device configures the layout of the application in step 109 considering the scaling variable. For example, the image display device may scale objects, which are part of the layout of the application, according to the scaling variable.

Figure 2:
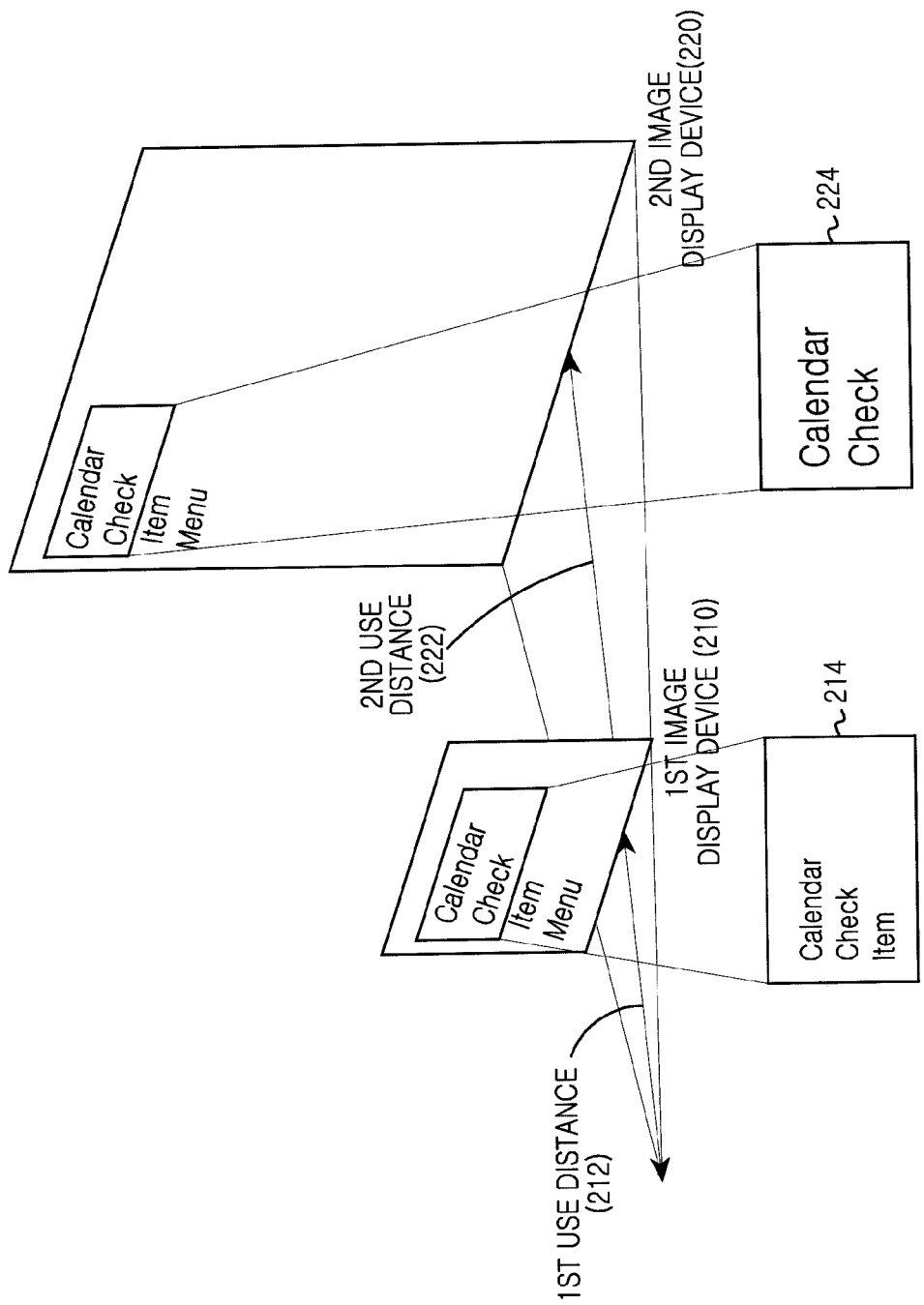
FIG. 2 is a diagram illustrating a screen configuration for scaling a layout of an application in an image display device according to an exemplary embodiment of the present invention.

As described above, when generating a scaling variable considering a distance between an image display device and a user, the image display device may configure a layout of an application as illustrated in FIG. 2 below.

FIG. 2 illustrates a screen configuration for scaling a layout of an application in an image display device according to an exemplary embodiment of the present invention.

Referring to FIG. 2, it is assumed that a first image display device 210 includes a display region of a size of 4.5 inches having a resolution of 480×800, and a second display device 220 includes a display region of a size of 10.1 inches having a resolution of 800×1280. In this case, the first image display device 210 has a Dots Per Inch (DPI) of 207, and DPI of the second display device 220 has a DPI of 149 according to Equation 1 below. The DPI, which is the number of dots or pixels included in one inch, represents a pixel density of the image display device.

$$DPI = \frac{\sqrt{\text{Horizontal } resolution^2 + \text{Vertical } resolution^2}}{\text{Display region size}} \quad (1)$$

In FIG. 2, a first use distance 212 between a user 200 and the first image display device 210 is equal to 30 centimeters (cm), and a second use distance 214 between the user 200 and the second image display device 220 is equal to 45 cm. In this case, the PPD of the first image display device 210 is equal to 43, and the PPD of the second image display device 220 is equal to 46 according to Equation 2 below. The use distance represents a distance at which the user 200 uses the first or second image display device 210 or 220.

$$PPD = 2S \text{ use distance(cm)Stan}(0.5 \text{ W})S\frac{DPI}{2.54(\text{cm})} \quad (2)$$

In Equation 2 above, the 'PPD' represents the number of pixels included in one inch, and the '2.54 cm' represents one inch.

In a case where the second image display device 220 using the PPD of the first image display device 210 as reference PPD configures a layout of an application, the second image display device 220 sets 1.07 (46/43), which is a ratio of PPD (i.e., 46) of the second image display device 220 to reference PPD (i.e., 43), as a scaling variable.

The second image display device 220 scales objects, which are part of the layout of the application, according to the scaling variable. For example, when a height of a list object 214 of the first image display device 210 is equal to 100 pixels, the second image display device 220 scales a height of a list object 224 of the second image display device 220, to 107 pixels.

As described above, the second image display device 220 scales a size of an object, which is part of a layout of an application, considering a use distance such that a user perceives the size of the object irrespective of the distance with the image display device. According to an exemplary embodiment of the present invention, the second image display device 220 scales the object at a constant ratio considering the use distance and a pixel density. Accordingly, the second image display device 220 may display more information than the first image display device 210 having a small-sized display region as illustrated in FIGS. 3A and 3B below.

Figure 3A:
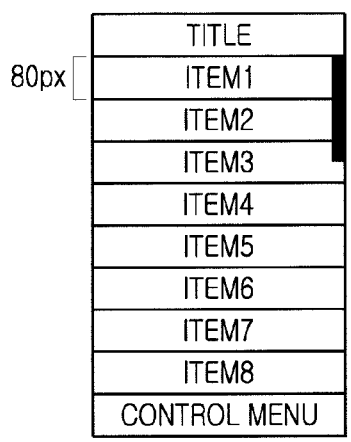
FIGS. 3A and 3B are diagrams illustrating a screen configuration of an application scaled in an image display device according to an exemplary embodiment of the present invention.
Figure 3B:
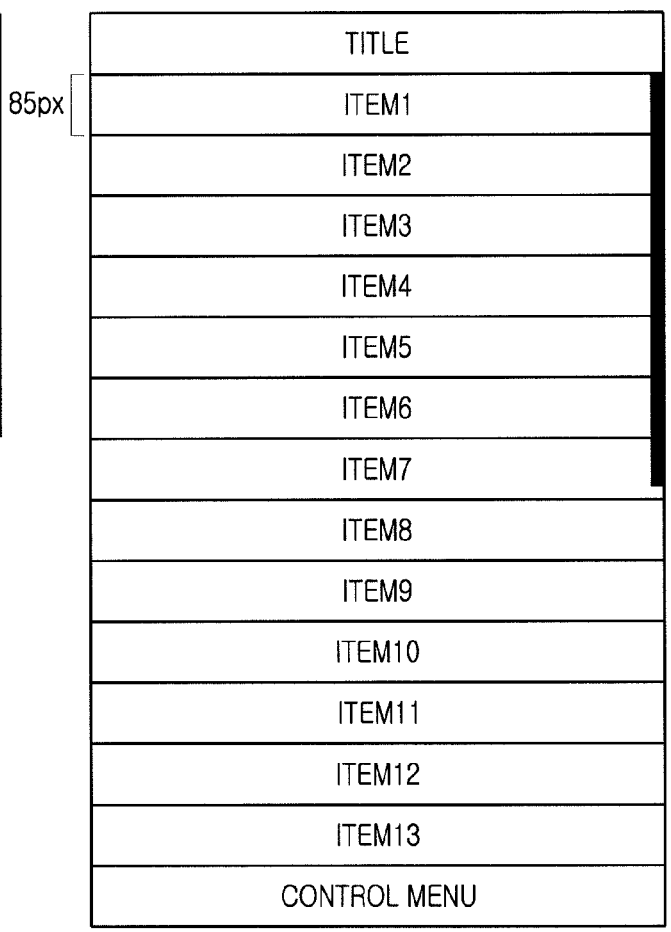

FIGS. 3A and 3B illustrate a screen configuration of an application scaled in an image display device according to an exemplary embodiment of the present invention. FIG. 3A illustrates a layout of an application scaled in a first image display device 210 including a display region of a size of 4.5 inches, and FIG. 3B illustrates a layout of an application scaled in a second image display device 220 including a display region of a size of 10.1 inches.

Referring to FIG. 3A, the first image display device 210 displays eight item objects in the display region of the size of 4.5 inches.

In a case where the second image display device 220 scales a layout of an application considering the second use distance 222, the second image display device 220 may display thirteen item objects in the display region of the size of 10.1 inches as illustrated in FIG. 3B. For example, the second image display device 220 scales the whole size of item objects considering the second use distance 222. Similarly, the second image display device 220 may scale only a height of item objects considering the second use distance 222 as illustrated in FIG. 3B. In this case, the second image display device 220 determines a horizontal length of an item object considering a horizontal size of the display region.

Figure 4:
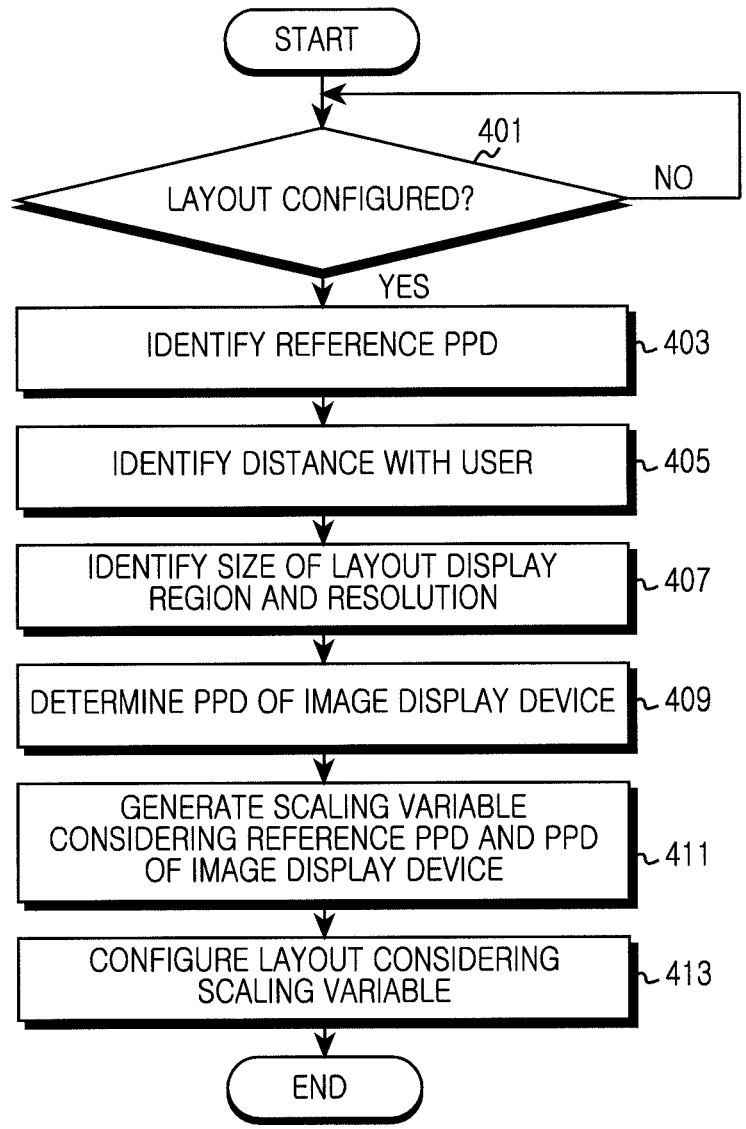
FIG. 4 is a flowchart illustrating a procedure for scaling a layout of an application considering a distance with a user, a resolution, and a size of a display region in an image display device according to an exemplary embodiment of the present invention.

An image display device may scale a layout of an application considering a variation of at least one of a use distance, a resolution, and a size of a display region as illustrated in FIG. 4 below.

FIG. 4 illustrates a procedure for scaling a layout of an application considering a distance with a user, a resolution, and a size of a display region in an image display device according to an exemplary embodiment of the present invention.

Referring to FIG. 4, in step 401, the image display device determines whether to configure a layout of an application. For example, the image display device may determine a user needs to select an application and configure a layout of the corresponding application.

If it is determined to configure the layout of the application, the image display device determines a reference PPD in step 403. The reference PPD represents a PPD becoming a reference in running the application. For example, when the second image display device 200 illustrated in FIG. 2 configures a layout of an application, the second image display device 220 may use a PPD of a first image display device 210 as the reference PPD.

After determining the reference PPD, the image display device determines a use distance at which a user uses the image display device in step 405. For example, the image display device may estimate a use distance considering a size of a display region.

After determining the use distance, the image display device determines the size of the display region displaying the layout of the application, and a resolution. For example, in FIG. 2, the second image display device 220 recognizes 10.1 inches as the size of the display region displaying the layout of the application, and recognizes 800×1280 as the resolution.

After determining the use distance, the size of the display region, and the resolution, the image display device determines a PPD of the image display device in step 409 considering the use distance, the size of the display region, and the resolution. For example, the image display device may apply the use distance, the size of the display region, and the resolution to Equation 2 above, and calculate the PPD of the image display device accordingly.

After determining the reference PPD and the PPD of the image display device, the image display device generates a scaling variable in step 411 considering the reference PPD and the PPD of the image display device. For example, the image display device may set the scaling variable as a ratio of PPD of the image display device to reference PPD.

After generating the scaling variable, the image display device configures the layout of the application in step 413 considering the scaling variable generated in step 411. For example, the image display device may scale objects, which are part of the layout of the application, according to the scaling variable.

According to the aforementioned exemplary embodiment, the image display device estimates a distance with a user considering a size of a display region. However, the image display device may estimate the distance based on other measures, such as those described below.

The image display device may estimate the distance at which the user uses the image display device using an ultrasonic sensor. The image display device estimates the distance at which the user uses the image display device considering a time difference between generating ultrasonic waves in the ultrasonic sensor and receiving the reflected ultrasonic waves.

The image display device may estimate the distance at which the user uses the image display device using an accelerator sensor. The image display device may estimate the distance at which the user uses the image display device considering a variation of a coordinate of the accelerator sensor when the accelerator sensor is initialized by a proximity sensor and a coordinate when a setting button is input by the user. Here, it is assumed that the user inputs the setting button at a reference distance. The reference distance may be an average distance at which the user uses the image display device.

The image display device may estimate the distance at which the user uses the image display device considering a size of an image acquired through a camera module. The image display device photographs an image of a user, who is located in the reference distance, through the camera module, and stores the photographed image as a reference image. By comparing a size of a photographed image of the user and a size of the reference image at a time point of scaling a layout of an application, the image display device estimates the distance at which the user uses the image display device.

The image display device may estimate the distance at which the user uses the image display device using two camera modules. The image display device estimates the distance at which the user uses the image display device considering an angle of each camera module of a time point when the two camera modules recognize a user's face.

As described above, an image display device determines a PPD of the image display device considering a use distance and a size of a display region. The image display device may display a scaled layout of an application only in a portion of the display region as illustrated in FIGS. 5A and 5B below.

Figure 5A:
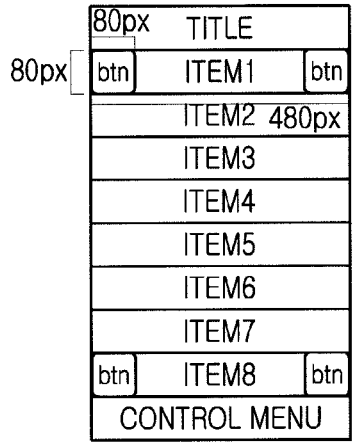
FIGS. 5A and 5B are diagrams illustrating a screen configuration of an application scaled considering a position of an object in a layout of an application in an image display device according to an exemplary embodiment of the present invention.
Figure 5B:
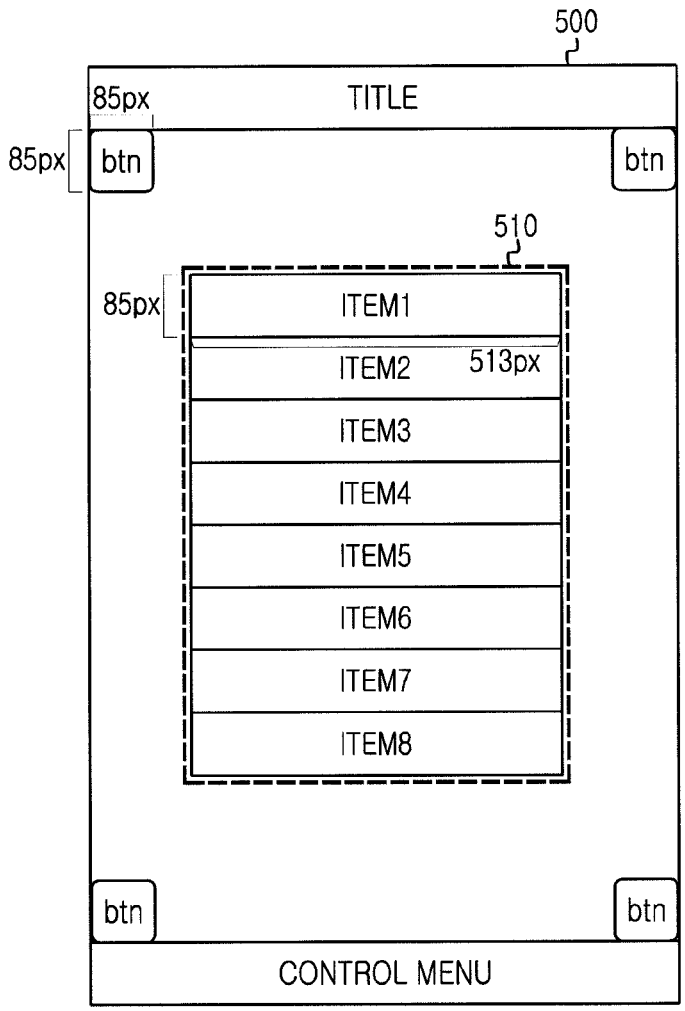

FIGS. 5A and 5B illustrate a screen configuration of an application scaled considering a position of an object in a layout of an application in an image display device according to an exemplary embodiment of the present invention. FIG. 5A represents a layout of an application configured in a first image display device, and FIG. 5B represents a layout of an application scaled in a second image display device.

Referring to FIG. 5A, the second image display device scales the layout of the application of FIG. 5A considering a use distance, a size of a display region, and a resolution. For example, the second image display device may determines a PPD of the second image display device considering the use distance, the size of the display region, and the resolution. The second image display device generates a scaling variable considering the PPD of the second image display device, and scales the layout of the application of FIG. 5A considering the scaling variable.

Referring to FIG. 5B, the second image display device may display the scaled layout of the application in a partial region of the center 510 of a display region 500 of the second image display device. The second image display device may display item objects other than an item object displayed in the center 510 of the display region 500 are displayed in the same position as their positions before the scaling as illustrated in FIG. 5B. The other objects may include a title object, a control menu object, and button objects.

Figure 6:
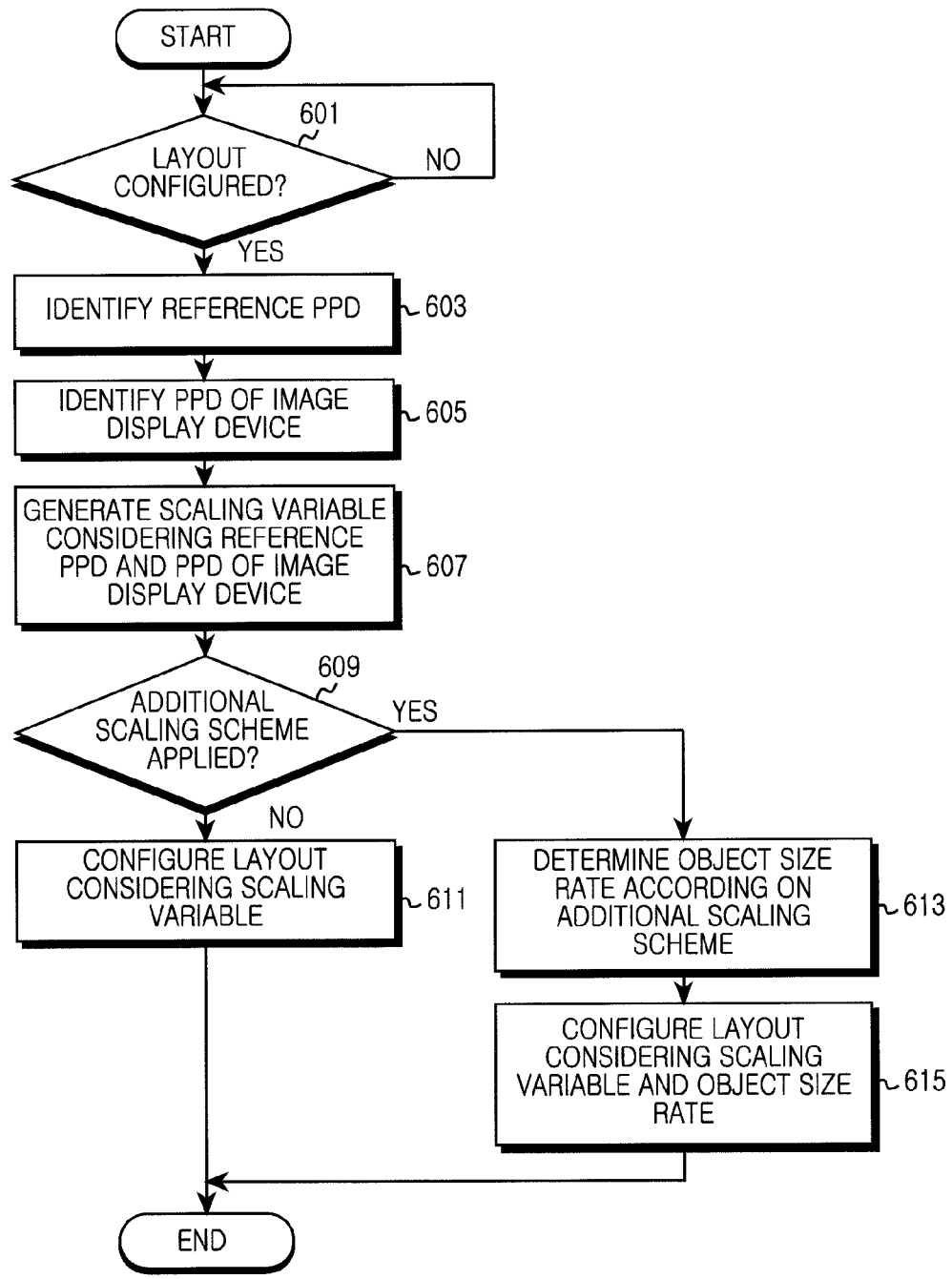
FIG. 6 is a flowchart illustrating a procedure for scaling a layout of an application using a plurality of scaling schemes in an image display device according to an exemplary embodiment of the present invention.

The image display device may scale a layout of an application using a plurality of scaling schemes as illustrated in FIG. 6 below.

FIG. 6 illustrates a procedure for scaling a layout of an application using a plurality of scaling schemes in an image display device according to an exemplary embodiment of the present invention.

Referring to FIG. 6, in step 601, the image display device determines whether to configure a layout of an application. For example, the image display device may determine whether a user needs to select an application and configure a layout of the corresponding application.

If it is determined to configure the layout of the application, the image display device determines a reference PPD in step 603. The reference PPD may represent a PPD becoming a reference in running the application. For example, when the second image display device 200 illustrated in FIG. 2 configures a layout of an application, the second image display device 220 may use a PPD of a first image display device 210 as the reference PPD.

After determining the reference PPD, the image display device determines a PPD of the image display device in step 605. For example, the image display device may calculate the PPD of the image display device considering a use distance, a size of a display region, and a resolution as illustrated in FIG. 4.

After determining the reference PPD and the PPD of the image display device, the image display device generates a scaling variable in step 607 considering the reference PPD and the PPD of the image display device. For example, the image display device may set a scaling variable as a ratio of the PPD of the image display device to the reference PPD.

The image display device determines whether to apply an additional scaling scheme in step 609. For example, the image display device determines whether a plurality of scaling schemes are used for scaling a layout of an application in an application setting file.

If it is determined in step 609 that the additional scaling scheme is not applied, the image display device configures the layout of the application in step 611 considering the scaling variable generated in step 607. For example, the image display device may scale all objects, which are part of the layout of the application, according to the scaling variable.

In contrast, if it is determined in step 609 that the additional scaling scheme is applied, the image display device determines in step 613 a size rate of an object in a layout of an application according to the additional scaling scheme. For example, the image display device may determine the size rate of the object in the layout of the application based on the resolution. The image display device may determine the size rate of the object in the layout of the application based on a pixel density. The image display device may determine the size rate of the object in the layout of the application based on the size of the display region. The image display device may determine the size rate of the object in the layout of the application based on at least two of the resolution, the pixel density, and the size of the display region.

After determining the size rate of the object, the image display device configures the layout of the application in step 615 considering the scaling variable generated in step 607 and the size rate of the object determined in step 613. For example, the image display device may apply the scaling variable and the size rate of the object to each object and scales the objects in the layout of the application.

In the aforementioned exemplary embodiment of the present invention, after the image display device generates the scaling variable considering the distance with the user in step 607, the image display device determines the size rate of the object according to the additional scaling scheme in step 613. According to another exemplary embodiment of the present invention, the image display device may generate the scaling variable and the size rate of the object in parallel.

Figure 7:
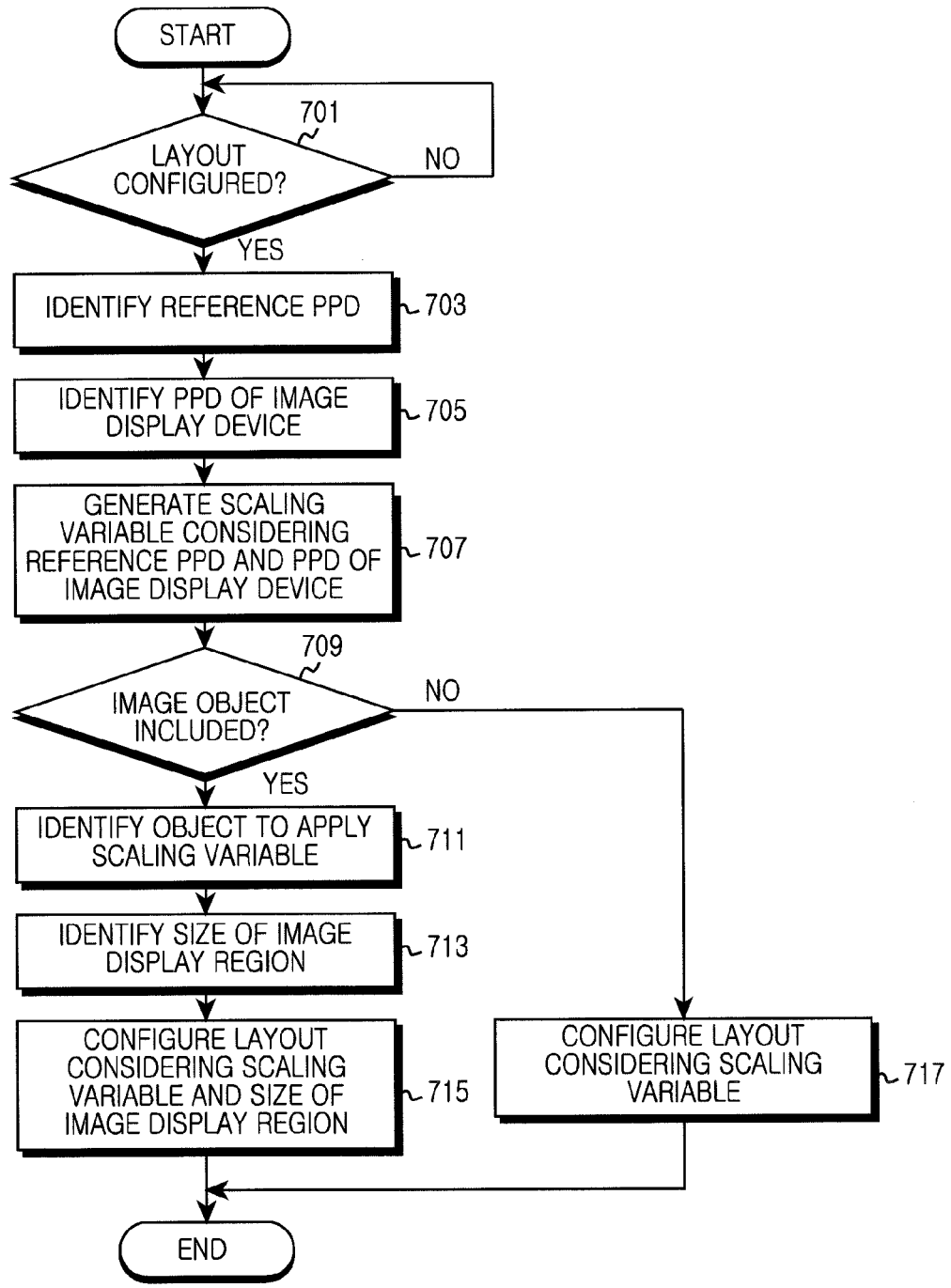
FIG. 7 is a flowchart illustrating a procedure for scaling a layout of an application considering an image object in an image display device according to an exemplary embodiment of the present invention.

When applying an additional scaling scheme to an image object based on a size of a display region, an image display device may configure a layout of an application as illustrated in FIG. 7 below.

FIG. 7 is a flowchart illustrating a procedure for scaling a layout of an application considering an image object in an image display device according to an exemplary embodiment of the present invention.

Referring to FIG. 7, in step 701, the image display device determines whether to configure a layout of an application. For example, the image display device may determine whether a user needs to select an application and configure a layout of the corresponding application.

If it is determined to configure the layout of the application, the image display device determines the reference PPD in step 703. For example, when the second image display device 200 illustrated in FIG. 2 configures a layout of an application, the second image display device 220 may use a PPD of a first image display device 210 as the reference PPD.

After determining the reference PPD, the image display device determines a PPD of the image display device. For example, the image display device may calculate the PPD of the image display device considering a distance at which a user uses the image display device, a size of a display region, and a resolution as illustrated in FIG. 4.

After determining the reference PPD and the PPD of the image display device, the image display device generates a scaling variable in step 707 considering the reference PPD and the PPD of the image display device. For example, the image display device may set a scaling variable as a ratio of PPD of the image display device to reference PPD.

The image display device determines whether an image object among objects in the layout is included in step 709. The image display device may determine the existence or non-existence of the image object in an application setting file.

If it is determined in step 709 that the image object is not included, the image display device configures the layout of the application in step 717 considering the scaling variable generated in step 707. For example, the image display device may scale all objects, which configure the layout of the application, according to the scaling variable.

Figure 8A:
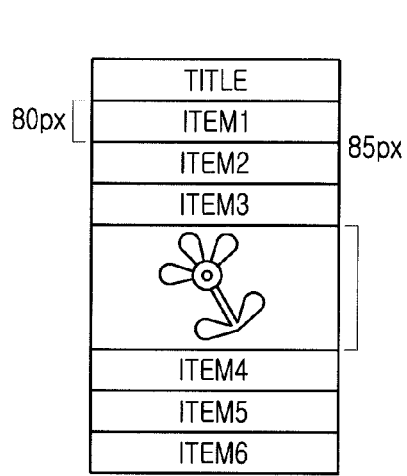
FIGS. 8A and 8B are diagrams illustrating a screen configuration of an application including an image object in an image display device according to an exemplary embodiment of the present invention.

In contrast, if it is determined in step 709 to include the image object, the image display device determines objects to apply the scaling variable, among the objects in the layout of the application, in step 711. For example, when scaling a layout of an application configured as in FIG. 8A, the image display device recognizes a title object, an item object, and a control menu object, as objects to apply the scaling variable and be scaled.

Figure 8B:
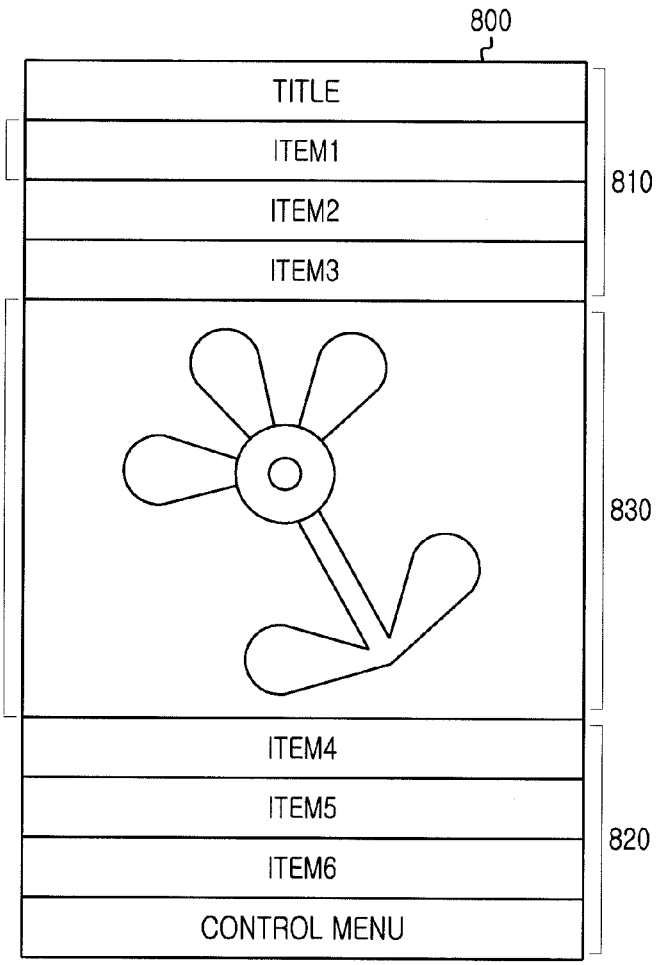

The image display device determines a size of an image display region for displaying the image object in step 713. For example, in FIG. 8B, the image display device determines sizes of a first region 810 and a second region 820 for configuring the title object, the item object, and the control menu object considering the scaling variable. The image display device recognizes a size of a 3rd region 830 excepting the sizes of the first region 810 and the second region 820 in the whole display region 800, as the size of the image display region.

After determining the size of the image display region, the image display device configures the layout of the application in step 715 considering the scaling variable and the size of the image display region. For example, the image display device may scale the title object, the item object, and the control menu object, which configure the layout of the application, according to the scaling variable. The image display device may also scale the image object considering the size of the image display region (i.e., the 3rd region 830). A horizontal scaling rate of the image object and a vertical scaling rate thereof may be applied differently depending on the size of the image display region.

In the aforementioned exemplary embodiment of the present invention, the image display device applies an additional scaling scheme to an image object among objects in a layout of an application, and scales the image object. According to another exemplary embodiment of the present invention, the image display device may apply the additional scaling scheme to at least one object other than the image object, and scale the at least one other object, not the image object.

An image display device for scaling a layout of an application considering a distance at which a user uses the image display device is described below. In the following description, it is assumed that the image display device performs a communication function; however, the image display device is not required to perform the communication function.

Figure 9:
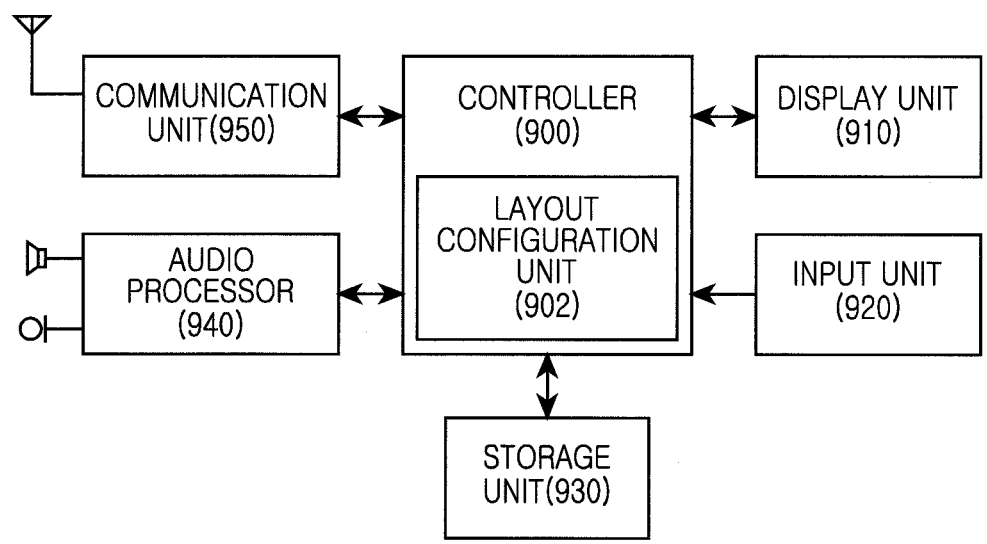
FIG. 9 is a block diagram illustrating a construction of an image display device according to the present invention.

FIG. 9 is a block diagram illustrating a construction of an image display device according to an exemplary embodiment of the present invention.

Referring to FIG. 9, the image display device includes a controller 900, a display unit 910, an input unit 920, a storage unit 930, an audio processor 940, and a communication unit 950. The image display device may also include additional components not shown here; these additional components may vary according to a function of the image display device.

The controller 900 controls overall operations of the image display device. The controller 900 controls a layout configuration unit 902 to configure a layout of an application.

The layout configuration unit 902 scales a layout of an application considering a use distance. For example, as illustrated in FIG. 1 and FIG. 4, the layout configuration unit 902 generates a scaling variable considering the use distance. The layout configuration unit 902 may scale objects in the layout of the application using the scaling variable, and configure the layout of the application for displaying in the display unit 910. As illustrated in FIG. 6 and FIG. 7, the layout configuration unit 902 may configure a layout of an application for displaying in the display unit 910 using a plurality of scaling schemes.

The display unit 910 displays status information of the image display device, a character input by a user, a moving picture, a still picture and the like according to control of the controller 900. For example, as illustrated in FIG. 2, FIGS. 3A and 3B, FIGS. 5A and 5B, and FIGS. 8A and 8B, the display unit 910 displays a layout of an application configured in the layout configuration unit 902. If the display unit 910 is constructed as a touch screen, the display unit 910 provides input data provided through the touch screen, to the controller 900.

The input unit 920 provides input data generated by user's selection to the controller 900. The input unit 920 may be constructed including only a control button for control of the image display device. The input unit 920 may be constructed as a keypad for receiving provision of input data from a user.

The storage unit 930 may include a program storage unit and a data storage unit. The program storage unit stores a program for controlling an operation of the image display device. The data storage unit stores data generated during program execution. The storage unit 930 may store at least one of an application setting file including reference PPD information and information of objects in a layout of an application, size information of the display unit 910, and resolution information. The storage unit 930 may include an application for scaling a layout of an application through the layout configuration unit 902. In this case, the layout configuration unit 902 may run the application stored in the storage unit 930 and scale the layout of the application.

The audio processor 950 controls input/output of an audio signal. The audio processor 950 may transmit an audio signal provided from the controller 900 through a speaker, and provide an audio signal provided from a microphone to the controller 900.

The communication unit 950 processes a signal transmitted/received through an antenna.

Although not illustrated in FIG. 9, the image display device may include at least one of an ultrasonic sensor, an accelerator sensor, and a camera module in order to measure a distance with a user.

In the image display device constructed as above, the layout configuration unit 902 may determine a scaling variable using preset PPD of the image display device. However, when the layout configuration unit 902 determines PPD of an image display device considering a use distance as illustrated in FIG. 4, the layout configuration unit 902 may be constructed as in FIG. 10 below.

Figure 10:
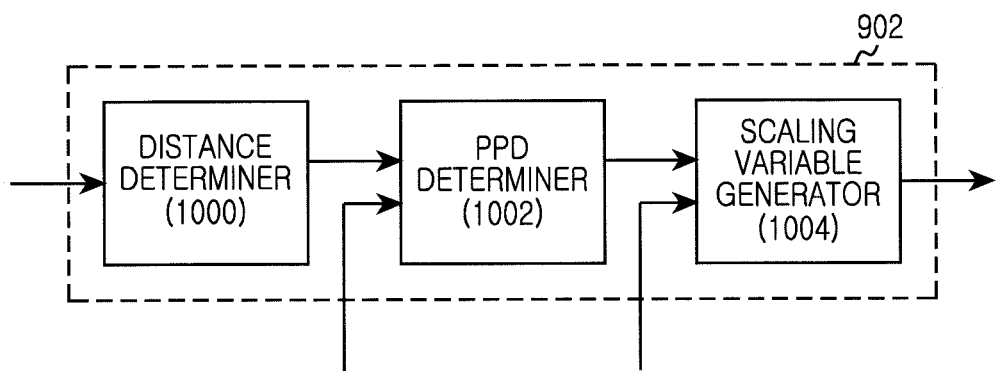
FIG. 10 is a detailed block diagram illustrating a construction of a layout configuration unit in an image display device according to the present invention.

FIG. 10 is a detailed block diagram illustrating a construction of a layout configuration unit in an image display device according to an exemplary embodiment of the present invention.

Referring to FIG. 10, the layout configuration unit 902 includes a distance determiner 1000, a PPD determiner 1002, and a scaling variable generator 1004.

The distance determiner 1000 determines a distance between the image display device and a user. The distance determiner 100 may determine the distance in any of a variety of methods. The distance determiner 1000 may determine the distance according to distance information stored in the storage unit 930. The distance determiner 1000 may estimate the distance with the user considering a size of the display unit 910. The distance determiner 1000 may estimate the distance at which the user uses the image display device, considering a time difference between generating ultrasonic waves in an ultrasonic sensor and receiving the reflected ultrasonic waves. The distance determiner 1000 may estimate the distance at which the user uses the image display device considering a variation of a coordinate of an accelerator sensor between when the accelerator sensor is initialized by a proximity sensor and when a setting button is input by the user. Here, it is assumed that the user inputs the setting button at a reference distance. The reference distance may include an average distance at which the user uses the image display device. The distance determiner 1000 may determine the distance by capturing an image of a user, who is located in the reference distance, through a camera module, and storing the photographed image as a reference image. By comparing a size of an image of the user photographed through the camera module and a size of the reference image at a time point of scaling a layout of an application, the distance determiner 1000 estimates the distance at which the user uses the image display device. The distance determiner 1000 estimates the distance at which the user uses the image display device considering an angle of each camera module of a time point when the two camera modules recognize a user's face.

The PPD determiner 1002 determines the PPD of the image display device considering a distance between the image display device and the user provided from the distance determiner 1000, a resolution provided from the storage unit 930, and size information of the display unit 910. For example, the PPD determiner 1002 may determine a DPI considering the resolution of the image display device and the size of the display unit 910. The PPD determiner 1002 applies the DPI and the distance between the image display device and the user to Equation 2 above and calculates the PPD of the image display device.

The scaling variable generator 1004 generates a scaling variable considering the PPD of the image display device provided from the PPD determiner 1002 and reference PPD provided from the storage unit 930. The scaling variable generator 1004 set the scaling variable as a ratio of PPD of the image display device to reference PPD.

It will be appreciated that exemplary embodiments of the present invention according to the claims and description in the specification can be realized in the form of hardware, software or a combination of hardware and software. Any such software may be stored in a non-transitory computer readable storage medium. The computer readable storage medium stores one or more programs (software modules), the one or more programs comprising instructions, which when executed by one or more processors in an electronic device, cause the electronic device to perform a method of the present invention. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement exemplary embodiments of the present invention. Accordingly, embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and embodiments suitably encompass the same.

As described above, exemplary embodiments of the present invention have an advantage of, by scaling a layout of an application considering a distance with a user in an image display device, being capable of providing an optimal layout of an application to the user, and being capable of providing device compatibility that the same application can be executed in various devices.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for scaling a layout of an application in an image display device, the method comprising:
   determining, by the image display device, a reference Pixels Per Degree (PPD);
   determining, by the image display device, PPD of the image display device based on a distance between the image display device and the user; and
   generating, by the image display device, a scaling variable based on a ratio of the PPD of the image display device to the reference PPD;
   scaling, by the image display device, a layout of an application based on a scaling variable, wherein the scaling of the layout of the application comprises scaling a whole size of objects or a height of objects in the layout of the application; and
   displaying the application on a display of the image display device according to the scaled application layout,
   wherein the reference PPD is a PPD of another image display device, and
   wherein the scaled layout of the application is different from a layout of the application of the other image display device.

2. The method of claim 1, wherein the determining of the PPD of the image display device comprises:
   determining Dots Per Inch (DPI) of the image display device based on the resolution of the image display device and the size of the display region thereof;
   determining the distance between the image display device and the user; and
   determining the PPD of the image display device based on the DPI of the image display device and the distance between the image display device and the user.

3. The method of claim 2, wherein the determining of the distance between the image display device and the user comprises estimating the distance between the image display device and the user based on the size of the display region of the image display device.

4. The method of claim 2, wherein the determining of the distance between the image display device and the user comprises estimating the distance between the image display device and the user via at least one of an ultrasonic sensor, an accelerator sensor, and at least one camera module.

5. The method of claim 1, wherein the scaling of the layout of the application comprises:
   scaling a size of at least one object in the layout of the application using the scaling variable; and
   displaying the scaled layout of the application.

6. The method of claim 1, further comprising:
   determining an object position for displaying at least one objects in the layout of the application in a display region of the image display device; and
   displaying the scaled layout of the application based on the object position.

7. The method of claim 1, further comprising:
   determining whether to use an additional scaling scheme, before scaling the layout of the application; and
   if not using the additional scaling scheme, scaling the layout of the application using the scaling variable.

8. The method of claim 7, further comprising:
   if using the additional scaling scheme, determining a size rate of an object according to the additional scaling scheme, and applying the scaling variable and the size rate of the object to each object in the layout of the application, and scaling the layout of the application.

9. The method of claim 8, wherein the additional scaling scheme comprises scaling the layout of the application based on at least one of a resolution of the image display device, a pixel density thereof, and a size of a display region thereof.

10. The method of claim 1, wherein the generating of the scaling variable comprises:
    determining PPD of the image display device based on at least one of the distance between the image display device and the user, a resolution of the image display device, and a size of a display region of the image display device, and
    wherein the PPD represents the number of pixels of the image display device comprised in a range of an angle of 1° from a user's sight according to the distance between the image display device and the user.

11. An image display device, comprising:
    a controller for determining a reference Pixels Per Degree (PPD), for generating a scaling variable based on a distance between the image display device and a user, and for scaling a layout of an application based on the scaling variable; and
    a display unit for displaying the scaled layout of the application,
    wherein the controller comprises:
        a distance determiner for determining the distance between the image display device and the user,
        a PPD determiner for determining PPD of the image display device based on the distance between the image display device and the user, and
        a scaling variable generator for generating the scaling variable based on a ratio of the PPD of the image display device to the reference PPD, and
    wherein the scaling of the layout of the application comprises scaling a whole size of objects or a height of objects in the layout of the application,
    wherein the reference PPD is a PPD of another image display device, and
    wherein the scaled layout of the application is different from a layout of the application of the other image display device.

12. The image display device of claim 11, wherein the PPD determiner determines Dots Per Inch (DPI) of the image display device based on the resolution of the image display device and the size of the display region thereof, and determines the PPD of the image display device based on the DPI of the image display device and the distance between the image display device and the user.

13. The image display device of claim 11, wherein the distance determiner estimates the distance between the image display device and the user based on the size of the display region displaying the layout of the application in the image display device.

14. The image display device of claim 11, wherein the distance determiner estimates the distance between the image display device and the user based on at least one of an ultrasonic sensor, an accelerator sensor, and at least one camera module.

15. The image display device of claim 11, wherein the controller scales a size of at least one object in the layout of the application based on the scaling variable.

16. The image display device of claim 11, wherein the controller identifies an object position for displaying at least one object among objects in the layout of the application in a display region of the image display device, and
wherein the display unit displays the scaled layout of the application based on the object position.

17. The image display device of claim 11, wherein the controller identifies whether to use an additional scaling scheme, and
if not using the additional scaling scheme, the controller scales the layout of the application based on the scaling variable.

18. The image display device of claim 17, wherein, if using the additional scaling scheme, the controller determines a size rate of an object according to the additional scaling scheme, applies the scaling variable and the size rate of the object to each object in the layout of the application, and scales the layout of the application.

19. The image display device of claim 18, wherein the additional scaling scheme comprises scaling the layout of the application on a basis of at least one of a resolution of the image display device, a pixel density thereof, and a size of a display region thereof.

20. The image display device of claim 11, wherein the PPD determiner determines PPD of the image display device based on at least one of the distance between the image display device and the user, a resolution of the image display device, and a size of a display region of the image display device, and
wherein the PPD represents the number of pixels of the image display device included in a range of an angle of 1° from a user's sight according to the distance between the image display device and the user.

* * * * *